United States Patent [19]

McMichael

[11] 3,801,187

[45] Apr. 2, 1974

[54] VEHICLE PERISCOPE

[76] Inventor: Cyrus McMichael, P.O. Box 255, Villa Park, Ill. 60181

[22] Filed: Jan. 24, 1973

[21] Appl. No.: 326,450

[52] U.S. Cl. ............................ 350/301, 356/254
[51] Int. Cl. ............................ G02b 23/08
[58] Field of Search ............. 350/301–302, 350/21–24

[56] References Cited
UNITED STATES PATENTS

| | | | |
|---|---|---|---|
| 3,043,195 | 7/1962 | Moultrie | 350/302 |
| 2,586,643 | 2/1952 | Garlow | 350/302 |
| 869,395 | 10/1907 | Schleth | 350/23 |
| 3,256,387 | 6/1966 | Beste | 350/21 |

*Primary Examiner*—Ronald L. Wibert
*Assistant Examiner*—Steven Morrison

[57] ABSTRACT

A vehicle periscope and more particularly a periscope for autos and trucks, intended to be mounted beside a standard rear view mirror wherein the two controls, one for raising and lowering and the other for rotating up to and including 360°, comprises three concentric cylinders. The inner, rotatable cylinder, having a short 90° bend on one end, in which sighting mirror is rigidly affixed in an oblique position, and a 90° flared portion at opposite end; said flared portion having slots along the full circumference, which complements teeth of a drive gear.

A middle cylinder having a longer 90° bend on one end and to which, a plain clear transparent glass is affixed at both ends, and a thin convex lens, said lens mounted along the inside of the horizontal portion of the bend. Opposite end of said middle cylinder, integral tab bent outwardly, 90° to the axis of said middle cylinder; an outermost cylinder which serves as the rigid protective frame and having an integral longitudinal rounded V-guide and an open square guide along its entire length, wherein the rounded V-guide accepts and guides said tab of the middle cylinder, while the open square guide accepts and guides a square threaded nut with rounded corners.

Said vehicle periscope also includes a specially designed molded mounting base with a horizontal annular opening slightly larger than the diameter of the innermost cylinder and wherein a protective and distance compensating slightly concave glass is mounted and also the obliquely positioned viewing mirror, said mounting base also contains annular openings, 90° with said horizontal annular opening, wherein the concentric cylinders are mounted together with the other components, which include a long threaded shaft for the square threaded nut, said shaft mechanically coupled to the shaft of a miniature direct current motor which is also mounted on said base; a long geared shaft which meshes with and complements the gear teeth shape slots of the flared end of innermost cylinder, and wherein said geared shaft is mechanically coupled to a rigidly flexible closely wound spring of sufficient length, with switch for stopping and reversing polarity, as it is intended to be mounted on the dashboard of a vehicle.

2 Claims, 4 Drawing Figures

PATENTED APR 2 1974 3,801,187
FIG. 1
FIG. 2
FIG. 3
FIG. 4
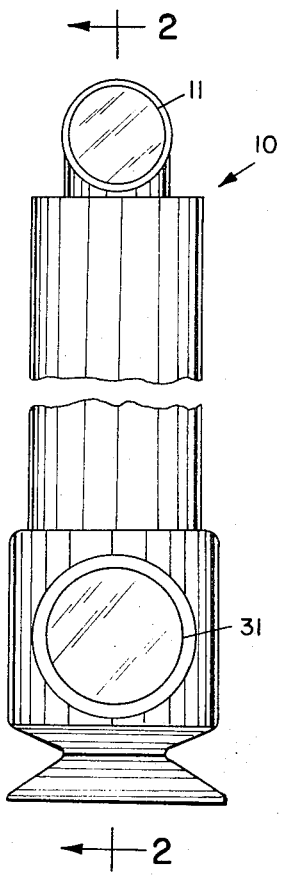
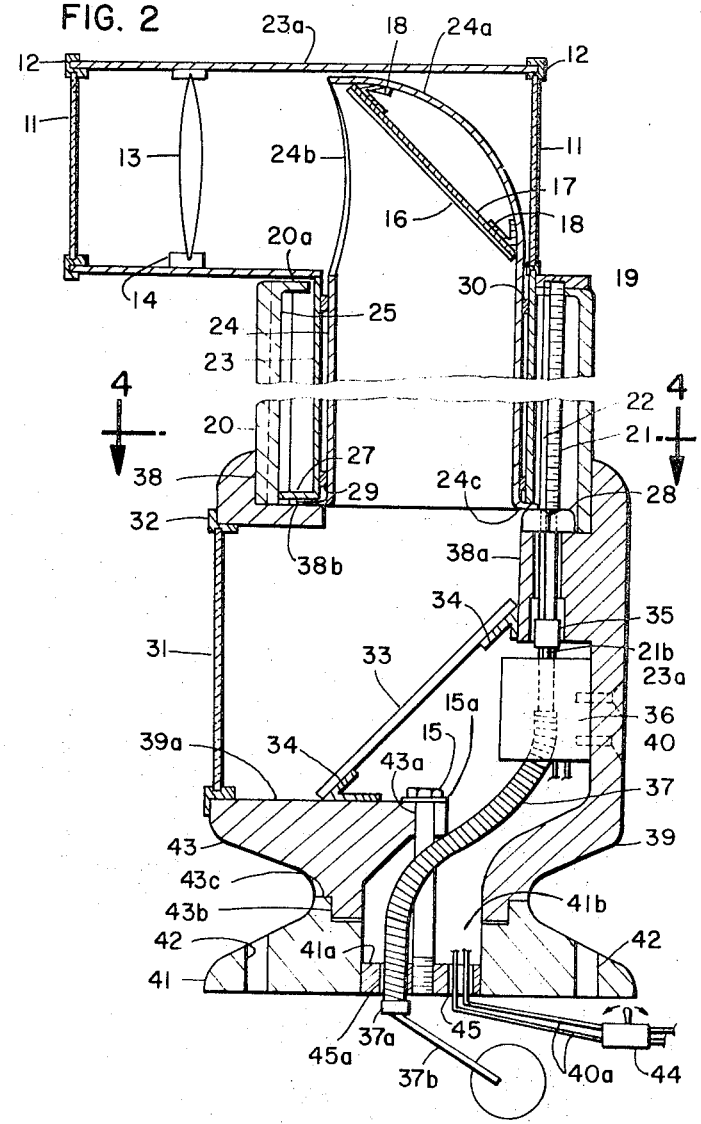
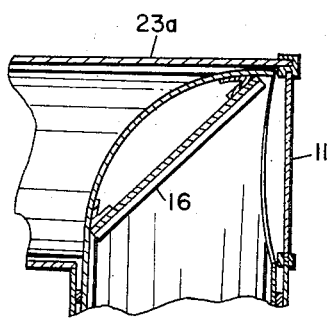
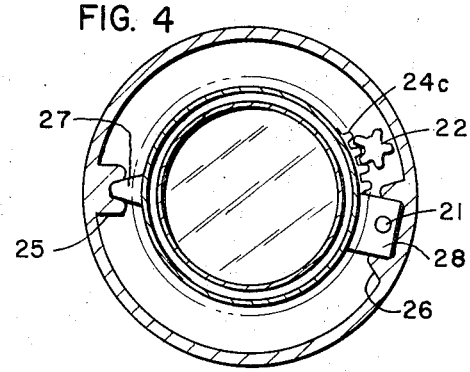

VEHICLE PERISCOPE

BACKGROUND OF INVENTION

1. Field of Invention

This invention relates generally to viewing devices for use with vehicles and more particularly to periscope type vision devices that can scan the surrounding areas with a minimum of effort.

2. Description of Prior Art

Prior art in this area is centered mostly, if not all, to devices that can be mounted on the vehicle roof; for the driver of the vehicle to have a clear view of the rear, arrangement of reflecting and viewing driver manipulated mirrors for clearer vision, arrangement of lenses and mirrors for better image of the objects viewed, distances of objects viewed, etc. It is to be noted that none of the above mentioned viewing devices has appeared or been used by vehicle owners nor have any been used as standard equipment on vehicles; as I can say without meeting great opposition that the standard rear view device on vehicles is still the side view mirror mounted outside to the left of the driver, and another mirror mounted inside called the rear view mirror. The present invention will fill the shortcomings of the standard side and rear view mirrors, while providing additional flexibility.

SUMMARY OF INVENTION

The difficulty of driving in congested streets and parking in self parking areas prompted me to come up with this present invention.

It is one object of the invention to overcome the blind spots inherent on side view and rear view mirrors.

It is another object of the invention to be able to make lane selection in heavy traffic, as my vehicle periscope can be raised to any desirable level up to above the roof level and lowered by a flip of a switch located on the dashboard, where all the controls of the standard equipment of a vehicle are located.

Still a further object of the invention is to provide a comfortable means of following a vehicle especially in heavy traffic.

While providing all the advantages and objects mentioned above, the viewer sees a true image of what is viewed, not inverted or reversed.

Yet another object of my invention is to offer a periscope viewing device that is intended to be mounted on the already accepted location and position, which is beside the side view mirror.

Further objects and advantages will surface with the illustrations provided by the accompanying drawings of preferred embodiments attached.

DESCRIPTION OF DRAWINGS

FIG. 1 shows a front view of the vehicle periscope.

FIG. 2 is a cross section taken on lines 2—2 of FIG. 1.

FIG. 3 is a partial sectional view, showing the rotating member rotated 180 degrees from initial position.

FIG. 4 is another section taken on lines 4—4 of FIG. 2 viewed in the direction of the arrows.

DESCRIPTION OF PREFERRED EMBODIMENTS

Referring now more particularly to the drawings, wherein is illustrated a new vehicle periscope device designated by the numeral 10, comprised of three concentric cylinders, 20, 23, and 24 wherein the innermost cylinder 24 has a short 90 degree bend designated by the numeral 24a and ending in an opening designated by 24b.

The opposite end of said innermost cylinder is flared, wherein the flared portion 24c makes an angle of 90° with the cylinder axis and having gear teeth 24d about the full flared circumference. The middle concentric cylinder 23, having horizontal cylinder 32a integrally affixed to upper end, and on the opposite end of said cylinder 23, is tab 27, bent outward and at 90° with the cylinder axis. The outermost cylinder 20 has a rolled in top 20a and a longitudinal rounded V-guide 25, and also an open square guide 26. Directly above said open square guide 26 and affixed rigidly thereof on the outside surface of the rolled in portion 20a, is a shaft retainer and positioner 29. Retainer 19 holds threaded shaft 21 and geared shaft 22 in place. Completing the arrangement of the concentric cylinders 20, 23 and 24, cylinder 24 is spaced from the middle cylinder 23 by spacers 29 and 30. The middle cylinder 23, maintains its position with respect to the cylinder 20 by the guides 25 and 26 and also the rolled in portion 20a.

Positioned on said open square guide 26, is a square threaded nut 28, with rounded corners. Threaded into said nut is the threaded shaft 21. The geared shaft 22 meshes with the mating peripheral gear 24c. The unthreaded portion end of said shaft 21 is mechanically coupled by coupling 35 to the motor shaft 21b, of the motor 36, while the round portion end 23a of the geared shaft 22, is mechanically coupled to a rigidly flexible closely wound spring 37.

The topmost annular opening 38, of base 39 accepts the bottom end of the concentric cylinder assembly, which rests on the shoulder 38b. A thicker shoulder 38a in which the shoulder 38b is a portion thereof, is located approximately 180° from the axis of another annular opening where the slightly concave lense 31 is mounted, the thicker shoulder portion 38a has two positioned thru holes, wherein the unthreaded portion end of the threaded shaft 21 and the round portion end of the geared shaft 22 pass through, and thus positively spaced from each other.

Base 39, is constructed in two parts, 41, designated lower part, and 43 the upper part, rotatably joined together by screw 15 and washer 15a. Said screw fitting through hole 43a and threaded into plate 41a, said plate integrally fixed in opening 41b of lower base 41. Lower and upper base parts, 41 and 43 respectively, are aligned by annular protrusion 43b and meet at surface 43c. This arrangement allows periscope to be rotated manually for limiting scanning.

The direct current motor 36 is mounted solidly to inside cylindrical surface of base 39 by two mounting screws or bolts 40, while the motor leades or wires 40a passes through the opening 45, at the bottom of said base and connected to a polarity reversing switch 44; the closely coiled spring 45 passes through the opening 45a affixed to the end 37a of a rod 37b. Now, if rod 37b is mechanically attached to some means so it will rotate in its axis, the torque will be transmitted to the coiled spring 37, and to the end portion 23a of the geared shaft 22, and on to the gear like slots 24c, hence rotating the innermost cylinder 24.

Describing now the lens and mirror arrangement, let us start with the sighting section. Two protective plain lenses 11, which can be also plastic of good optical characteristics, are mounted in position by mounting means 12, at the ends of the horizontal cylinder 23a. Affixed within cylinder is a thin convex lens 13 by means 14, mirror 16 is obliquely positioned at approximately 45° with the horizontal and is fastened to plate 17, which is held by tabs 18, in turn are permanently affixed to the opposite peripheral ends of the elbow 24a of the innermost cylinder 24. The oblique position of the mirror 16, is such that its projected area on a plane perpendicular with the cylinder axis is equal to the cross sectional area of said cylinder 24.

The image receiving and viewing mirror 33, which is rigidly attached and positioned approximately 90° with mirror 16, is mounted to the inside surface of the shoulder 38a by means 34, and to the portion 39a of base, and in such a manner that its area is projected on a plane parallel to the slightly concave lens 31, equalling the area of lens 31. The slightly concave lens 31 is permanently positioned at the mouth of the corresponding opening on the mounting base 39 by means 32.

In operation then, for rear viewing, the light reflected from the object being sighted enters and passes through plain glass 11, to the thin convex lens 13 which inverts and reverses the image as it strikes the mirror 16.

As the inverted and reversed image is reflected to the viewing mirror 33, it is re-inverted and re-reversed by said mirror 33, hence what is viewed on the mirror 33 is a true image. The slightly concave lens 31, slightly enlarges the image reflected from mirror 33. In actuality, it corrects the decrease in image size from mirror 16 to 33. It is to be noted that the distance of mirror 16 from the lens 13 is the focal length of said lens 13, and likewise, the distance of lens 31 from the mirror 33 is its focal length. It should also be noted that the length or height of the cylinder 24, up to the bent portion is slightly more than half the distance between the point where it is intended to be mounted on the car, and the roof of the car. Hence, in raised position, it extends above the roof level of the car.

Raising and lowering of the cylinders 23 and 24, is effected by the motor 36 rotating threaded shaft 21. Since the threaded nut does not rotate, it travels up or down depending on motor rotation, clockwise or counterclockwise. Since the two cylinders in a way rest also on the top surface portion of nut 28 and longitudinally guided by the guide 25, and also the geared shaft, said cylinders 23 and 24 travel with movement of the nut 28. It was pointd out that only cylinder 24 rotates. This is so, because cylinder 23 is held in radial position by the tab 27, which fits V-guide 25.

In the 180° rotated position of the cylinder 24, (FIG. 3) or forward viewing, the inverting lens 13 is not required as the image reflected by the mirror 33 from mirror 16 is a true image. This parallel arrangement of two mirrors is the simple periscope arrangement.

I claim:

1. An improved land vehicle periscope having three concentric cylinders comprising an innermost cylinder have a ninety degree elbow on an upper end of said cylinder, a plate permanently affixed across said elbow by bracket means, an obliquely positioned first reflecting mirror affixed to said plate, said mirror reflecting an image vertically downward through said cylinders to a second reflecting mirror, called a viewing mirror, said innermost cylinder having a lower end, said lower end containing an integral, outwardly flared portion which is slotted in a gear like manner along the full circumference of said innermost cylinder, said flared and slotted portion resting on a top surface of an inside shoulder of a two sectioned, molded mounting base, a second cylinder, called a middle cylinder, concentric with and surrounding said innermost cylinder and having an upper portion on which a horizontal, tubular member is an integral part thereof, said horizontal tubular member retaining a vertical, plane lens at each end of said tube and a single vertically disposed convex lens between one plane lens and said first reflecting surface, the edges of said plane lenses and said convex lens being aligned parallel, said middle cylinder having a lower portion having an integral tab bent outward and positioned to prevent said middle cylinder from rotating, a rigid outermost cylinder, concentric with said innermost cylinder and said middle cylinder, and serving as the rigid outer protective cover and frame of said periscope, said outermost cylinder containing two integrally formed vertically disposed slots, one said slot co-operating with said tab of said middle cylinder to prevent rotation thereof the other said slot for channelling means to drive said innermost and said middle cylinder for elevation thereof, aid outer most cylinder having an upper portion with an inwardly flared flange as an integral part thereof, the lower portion of said cylinder secured in the top surface of the two sectioned base member on said inside shoulder common to the resting surface of said innermost cylinder, said base member also supporting mounting tabs disposed below said concentric cylinders said tabs attached directly to said viewing mirror and oriented within said base member to horizontally redirect light falling substantially vertically downward through said innermost cylinder to a viewing opening, said opening vertically supporting a concave lens, said base two sectioned member also having means for rotating said innermost cylinder consisting of a rotatable flexible coiled spring through both sections of said base driven by rod means within said coiled spring, said rod means having a gear connected thereto, the gear having an axis aligned vertically and in driving engagement with said slotted integral outwardly flared portion of said innermost cylinder, whereby said innermost cylinder and hence said first reflecting mirror rotates when said rod is rotated.

2. A land vehicle periscope as recited in claim 1, further comprising a periscope elevating, direct-current motor mounted on said base between said viewing mirror and said base, two wires connecting said motor through both sections of said base to an electric polarity reversing switch externally disposed to said periscope, said motor having a vertically disposed threaded shaft mounted for rotation by and extending upwardly from said motor, a square nut mounted on said threaded shaft and supporting said flange of said innermost cylinder, said square nut engagingly channelled in said outermost cylinder to prevent rotation of said nut when said vertically disposed, threaded shaft is rotated by said motor, whereby said innermost cylinder and said middle cylinder are raised or lowered with respect to said outermost clylinder when said direct-current motor is energized.

* * * * *